United States Patent [19]

Hungerford

[11] Patent Number: 5,009,151

[45] Date of Patent: Apr. 23, 1991

[54] BARBECUING PROTECTIVE FOOD SUPPORT

[76] Inventor: Robert E. Hungerford, 116 Lake Desire Dr., N., Renton, Wash. 98058

[21] Appl. No.: 339,059

[22] Filed: Apr. 14, 1989

[51] Int. Cl.⁵ ............................................ A47J 37/06
[52] U.S. Cl. ...................................... 99/445; 99/425; 99/446; 99/449; 126/25 R; 126/39 M
[58] Field of Search ................. 99/375, 400, 408, 425, 99/444, 445, 446, 448, 449; 126/25 R, 39 M, 41 R; D7/359, 363, 367, 388, 408, 409

[56] References Cited

U.S. PATENT DOCUMENTS

| | | | |
|---|---|---|---|
| D. 30,175 | 2/1899 | Wagner | D7/388 |
| 75,107 | 3/1868 | Andrews . | |
| 181,823 | 9/1876 | Cornwall . | |
| 1,373,788 | 4/1921 | Ball | 99/425 |
| 1,732,910 | 10/1929 | Possons | 99/425 |
| 1,899,682 | 2/1933 | Goldenberg | 99/445 |
| 2,198,647 | 4/1940 | Wolcott | 99/425 |
| 3,113,505 | 12/1963 | Keppler | 126/39 M |
| 3,186,331 | 6/1965 | Dettling | 99/445 |
| 3,256,806 | 6/1966 | Jordan | 99/444 |
| 3,407,723 | 10/1968 | Varkala | 99/349 |
| 3,509,814 | 5/1970 | Karapetian | 99/445 |
| 3,717,083 | 2/1973 | Karapetian | 99/450 |
| 3,842,726 | 10/1974 | Fautz | 99/425 |
| 3,847,068 | 11/1974 | Beer et al. | D7/359 |
| 4,034,662 | 7/1977 | McLane | 99/445 |
| 4,121,510 | 10/1978 | Frederick | 99/425 |
| 4,211,206 | 7/1980 | Darbo | 99/449 |
| 4,240,398 | 12/1980 | Lindop | 126/25 R |
| 4,342,259 | 8/1982 | Lee | 99/425 |
| 4,393,857 | 7/1983 | Sanford | 99/449 |
| 4,394,410 | 7/1983 | Osrow et al. | 428/43 |
| 4,428,281 | 1/1984 | Miller | 99/445 |
| 4,727,853 | 3/1988 | Stephen et al. | 126/41 R |
| 4,768,427 | 9/1988 | Cheng | 99/445 |

FOREIGN PATENT DOCUMENTS

| | | | |
|---|---|---|---|
| 334029 | 12/1903 | France | 99/444 |
| 2456487 | 1/1981 | France | 99/448 |
| 211634 | 1/1941 | Switzerland | 99/445 |
| 591 | of 1852 | United Kingdom | 99/445 |
| 2155311 | 9/1985 | United Kingdom | 99/446 |

Primary Examiner—Philip R. Coe
Assistant Examiner—Mark Spisich
Attorney, Agent, or Firm—Christensen, O'Connor, Johnson & Kindness

[57] ABSTRACT

A cooking protective food support that includes a plurality of raised portions and a plurality of lower portions supports food to be cooked and collects cooking food juices. The support retains the cooking food juices so the food is self-basted or rehydrated. Additionally, the support retains the cooking food juices to prevent flare-ups that often occur when the cooking food juices come in direct contact with the heat source. The food support is invertible so that cooking food juices on the surface that is not supporting the food are burned away by the heat source.

13 Claims, 3 Drawing Sheets

BARBECUING PROTECTIVE FOOD SUPPORT

BACKGROUND

In respect to often pleasant party times centering around an outdoor dinnertime, when a barbecuing time is involved, there are unpleasant times, when, for example, food juices and liquid fats drip into the fire below to cause flare-ups which often burn the food. Or, unwanted odors arise from the heating of previous barbecuing time residues, or from starter fluids. Many times, the grill of a barbecue cooker has not been thoroughly cleaned, if cleaned at all, from a previous barbecuing time, and an unhealthy appearance and/or condition continues on into the follow on barbecuing time. Then, after the party is over, the grill and the interior of the barbecue cooker often need extensive cleaning. Such cleaning generally waits until the next day or later, increasing the effort required to remove the food and grease residues.

Although these drawbacks or inconveniences associated with barbecuing time continue to haunt persons today in respect to their barbecuing time, and there is a need for a product to be marketed more aggressively today to eliminate essentially all these drawbacks or inconveniences, there have been prior products offered by others, which, if made available could be utilized by persons during their barbecuing time. In reference to U.S. patents:

In 1868, William Andrew in his U.S. Pat. No. 75,107 disclosed his gridiron, which was a combined gridiron and frying pan used for broiling or frying food. Spaced ribs or bars supported the food, and gutters located between the ribs directed the gravy, i.e. food juices and liquid fats, into a collecting basin, keeping them clear of the fire;

In 1876, George Cornwall in his U.S. Pat. No. 181,823 disclosed his gridiron which served like William Andrew's gridiron, and had an improved gravy collecting basin positioned away from the main heat of the cooking fire;

In 1963, Arnold G. Keppler in his U.S. Pat. No. 3,113,505 illustrated and described his disposable broiling tray formed of very light gauge sheet material, such as lightweight aluminum. Food to be broiled was placed on this tray, which was corrugated, with the food resting atop the corrugations. During the broiling time in an oven, the grease rendered from the foods being broiled collected in the lower portions of the corrugations. Following the broiling time and food serving time, the lightweight broiling tray was disposed of, while still containing the grease. The ends of the corrugations were formed to provide portions which kept the grease in the corrugations;

In 1966, David D. Jordon in his U.S. Pat. No. 3,256,806, disclosed his expandable pan made of an aluminum sheet material preformed and compacted, and sold compacted for convenient storage in a kitchen. When expanded for use, Mr. Jordon's pan served in a like manner to Mr. Keppler's disposable broiling tray;

In 1970, Carl Karapetian in his U.S. Pat. No. 3,509,814 illustrated and disclosed his disposable barbeque grill in circular and rectangular embodiments made from thin metallic material. The food during the barbecuing period, was supported on an integral grid work. Adjacent integral indentations directed the food juices and liquid fats to the integral side walls, then to a surrounding integral rim for collection, until poured into a collecting can, via an integral pour spout. Mr. Karapetian in his patent, noted that earlier, Mr. Hoke in his U.S. Pat. No. 3,082,757 disclosed a cover to fit on a permanent grill, protecting portions thereof, but not all portions of the permanent grill, from being contacted by dripping food juices and liquid fats;

In 1983, Harold Osrow in his U.S. Pat. No. 4,394,410 illustrated and described his disposable foil broiling sheet. He provided a roll of these preformed, interconnected disposable foil broiling sheets for storage in a kitchen. When needed one sheet was removed and arranged in a planar configuration over a primary grill of an oven. The food, while being broiled, was supported above the primary grill while resting on the top surface areas of the top layer of the disposable foil broiling sheet. The food juices and liquid fats were directed to recessed surface areas and then down through drains into an internal layer made of an originally dry bibulous material for containment of these dripping liquids, as the surrounding bottom layer was made of an impermeable foil to complete the capture of the food juices and liquid fats.

These inventors and others have provided reusable and disposable products to be used by persons broiling foods in ovens, over permanent grills, and in barbecuing cookers, to collect all the food juices and liquid fats keeping them from reaching the heating source and/or surrounding structure, and collecting them for convenient removal and disposal. Yet, there remains a need for another try at providing a product which will be used more extensively by persons preparing foods during broiling in oven times, barbecuing times, and/or camping times, which is lightweight, low cost, nestable, keepable, or disposable, depending on the selected embodiment, and which may have other features making its use more desirable.

SUMMARY

During many barbecuing periods, dripping food juices and liquid fats reach the heating source, often generating flaring flames which over-burn the food. Also flavors, less appetizing, generated below around the heating source, are released to surround the cooking food during the barbecuing period changing unfavorably the odor and taste thereof. Then, after barbecuing periods, the grills of the barbecue cookers and/or the surrounding inside surfaces of these barbecue cookers are not always cleaned sufficiently.

Therefore, this barbecuing protective food support, clean as a new product, or well cleaned after a first barbecuing time, is used to cleanly support food above a heating source. This support is either in turn supported on a grill of a barbecue cooker, often not kept too well cleaned, or supported on its own related supports.

Each barbecuing protective food support has a body of essentially one material of one thickness formed, under pressure, to create integral raised portions to directly support the food to be cooked, and to create integral lower portions positioned to receive dripping food juices and liquid fat during a barbecuing period, with each end of each lower portion having integral upstanding ends to retain the food juices and liquid fat within the respective lower portion and thereby from reaching the heating source. Regarding all forms of these barbecuing protective food supports, there is a common cross sectional integral appearance of a repetitive cycling pattern.

Each of these barbecuing protective food supports, after the completion of a first barbecuing period, is turned over, whereby the former bottom becomes the top to protectively receive the food, and during the follow on barbecuing period, the former top, now the bottom, is cleaned by the heat of the heating source. Each one is during manufacture, following alternate specifications, left uncoated and made of low cost material, whereby after at least two barbecuing times, it may then be considered disposable. Or each one may be coated by a non stick coating. Or each one may be coated by porcelain. Each of the latter two barbecuing protective food supports are considered recleanable and reusable for several barbecuing times, wherein the food being cooked is well protected.

DRAWINGS

Preferred embodiments of the barbecuing protective food supports are illustrated in the drawings wherein.

Figure 1:
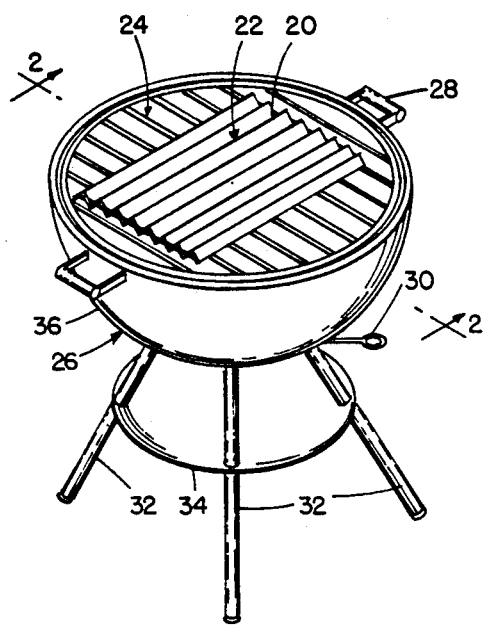
FIG. 1 is a perspective view of one type of many types of barbecue cookers which is designated as a kettle barbecue cooker, illustrating the removable permanent grill thereof, on which an embodiment of the barbecuing protective food support has been placed.
Figure 2:
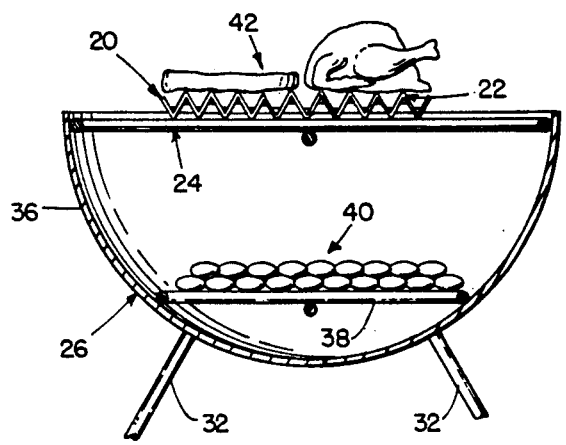
FIG. 2 is a partial cross sectional view of a portion of the kettle barbecue cooker, the removable permanent grill thereof, the barbecuing protective food support, and food positioned on this protective food support, and centered over the charcoal heating source arranged on the lower removable charcoal support.
Figure 3:
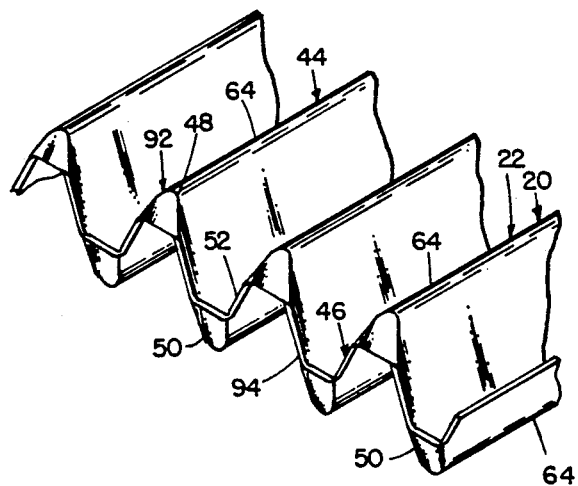
Figure 4:
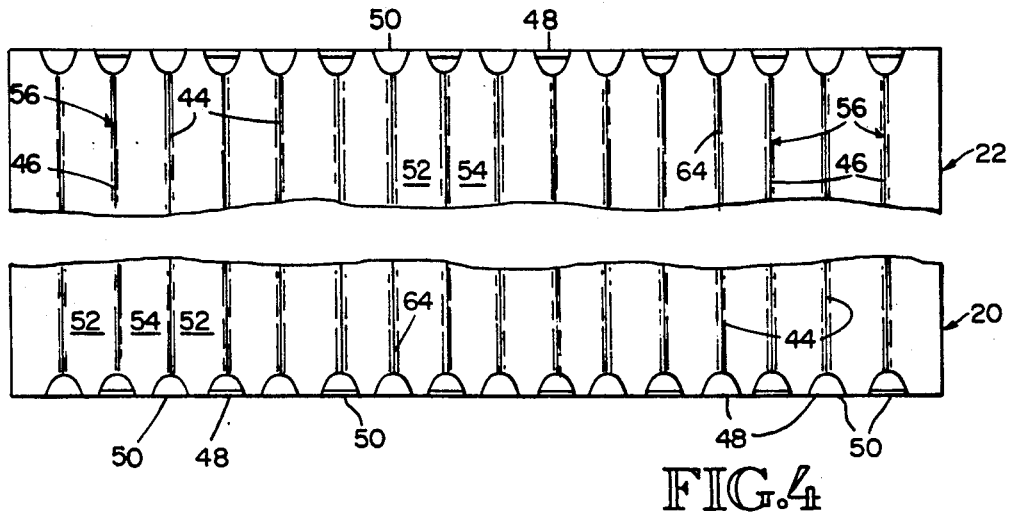
Figure 5:
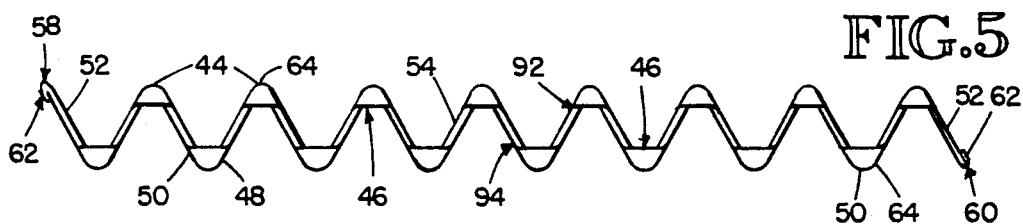
Figure 6:
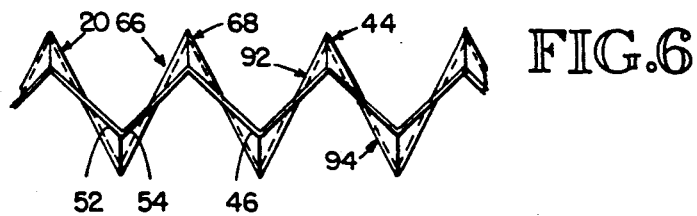
Figure 7:
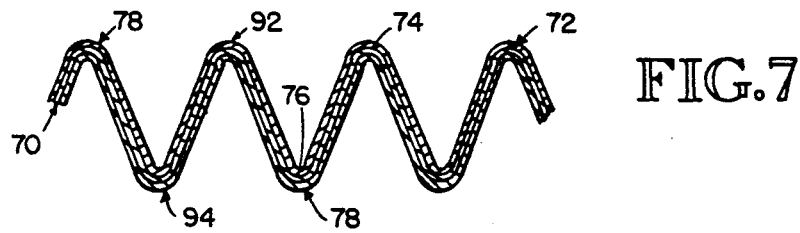
Figure 8:
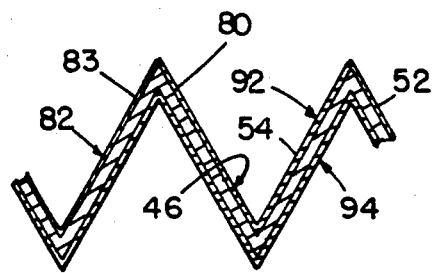
Figure 9:
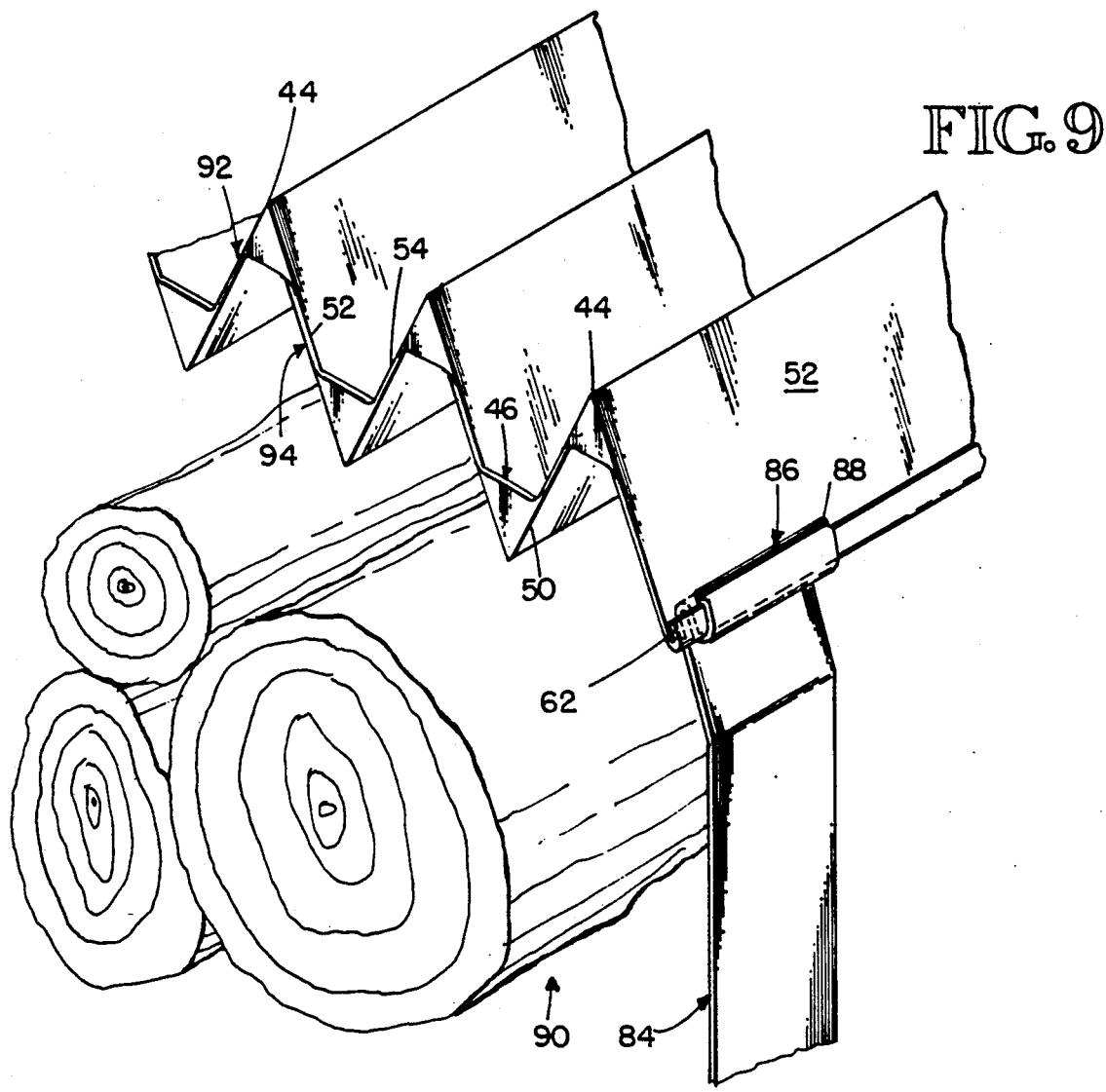

FIG. 3 is a partial perspective view of the end respective integral bent back portions of the barbecuing protective food support, which are so arranged to keep the food juices and liquid fats in the lower portions thereof, until the barbecuing time is completed, for their subsequent controlled disposal, thereby eliminating any flame ups by avoiding any spills or drippings of food juices and liquid fats down into the heated charcoal and thereby keeping the permanent grill and the interior of the kettle barbecue cooker clean and clear of any such spills or drippings;

FIG. 4 is a top view of one embodiment of this selected barbecue cooker, with a central portion removed for purposes of illustration, and a bottom view would be similar;

FIG. 5 is an end view of the embodiment shown in FIG. 4;

FIG. 6 is an end view of another embodiment with respect to slanted surfaces joining in acute apexes, as shown in FIGS. 1 and 2, in contrast to the embodiment of FIGS. 3, 4 and 5 with respect to having curved apexes;

FIG. 7 is a partial cross section of another embodiment utilizing multi-curved steel having a porcelain coating;

FIG. 8 is a partial cross section of another embodiment utilizing multi-bent aluminum having a non-stick coating; and FIG. 9 is a partial perspective view of one corner of another embodiment showing how one of four retractable legs are utilized to support a primary barbecuing protective food support above a heating source, such as a wood camp fire.

DESCRIPTION OF PREFERRED EMBODIMENTS

Introduction of All Embodiments

The barbecuing protective food support 20 in the various embodiments, illustrated in the drawings, is used to insure the food being cooked rests on initially clean surface areas. Also this food support 20 retains the food juices and liquid fats, below the food being cooked, for the controlled heating thereof, to create good flavoring smoke that enhances the taste of the cooking food. Moreover, by retaining the food juices and liquid fats in this barbecuing protective food support 20, they are kept from dripping down into the heating source, to otherwise possibly cause a flame flare up, which could reach the food being cooked and possibly unwantedly burn the food being barbecued.

The assurance of providing a clean support for the food continues on for the following barbecuing time, because the bottom side or underside, during the first barbecuing time, is well heated to clean and to sterile it. Then this cleaned underside becomes the top side during the second barbecuing time. In respect to a throw away embodiment of this barbecuing protective food support 20, formed of a light gauge metal, there is at least two barbecuing times, before this food support 20 is properly disposed of. Even a so called disposable or throw away food support 20, and certainly such food supports 20, made of more costly materials, and/or covered with non sticking coating or porcelain should be used for several and/or many more barbecuing times. If so, then the cooking surfaces, following each barbecuing time are scraped and brushed reasonably well. Thereafter, this scraped and brushed side becomes the bottom side or underside during the next barbecuing time, and the heat or underside during the next barbecuing time, and the heat created from the heating source serves to further clean and to sterilize this underside. Then during the third barbecuing time this underside becomes again the clean top side on which the food is placed for barbecuing.

When this protective food support 20 is consistently used, there is no dripping of food juices down into the heating source and any structures holding the heating source. Therefore, there is no reheating of old food juice remains, and consequently there is no possible creation of unpleasant odors emanating from these reheated old food juices and/or their residues.

Whether this barbecuing protective food support 20 is considered to be a throw away or disposable food support 20, or to be a reusable food support 20 to be used for many barbecuing times, the respective embodiments will be either used as shown in FIG. 1, when the food support 20, is in turn placed on a so called permanent grill of a barbecue cooker, or when the food support 20 is supported in another way, directly over a heating source, such as by using snap-on legs, as shown in FIG. 9.

The Throw Away, i.e. Disposable Barbecuing Protective Food Support

Light gauge material, such as light gauge aluminum or steel, is formed directly into this barbecuing protective food support upon the operation of machines, which stamp out the product. One resulting throw away, i.e. disposable food support 22 is illustrated in FIGS. 1 through 5 and another one in FIG. 6. As shown in FIGS. 1 and 2, this embodiment 22, or any other embodiment of the food support 20, is supported on the so called removable but permanent grill 24 of a barbecue cooker 26. Such a cooker 26, may be the kettle type 26, as shown having handles 28, vent and ash removal lever 30, legs 32, ash collector tray 34, the kettle body 36, and the charcoal or other fuel heating source support 38, to position charcoal 40 in the burning locale thereof.

As shown in FIG. 2, the food 42, such as meat, fish, or fowl, is supported on the spaced curved crests 44 or apexes 44 of the integral parallel triangular shaped troughs 46. Each trough 46, at each end 48 thereof, terminates in an integral bent up dam 50, blocking substantially at least one quarter of the depth of a respective trough 46, as illustrated in FIGS. 3, 4, and 5. During barbecuing times, the food juices and liquid fats drip down, to be deflected by the slanted sides 52, 54 of the trough 46, into the bottom dammed collecting reservoir 56 of each trough 46. Both the starting longitudinal edge 58 and the terminating longitudinal edge 60 of this disposable barbecuing protective food support 22, have respective bent back smooth reinforcing longitudinal portions 62.

As shown in FIG. 2, the crests 44 or apexes 44 are curved 64 to accommodate not only a stamping operational procedure, but also an alternative molding operational procedure during the manufacture of the barbecuing protective food support 20. Then, as shown in FIG. 6, in the food support embodiment 66, the crests 44 or apexes 44 are not curved, instead each one is a direct integral changeover 68 from one slanted side 52 to the other slanted side 54 of each trough 46. This embodiment 66 is manufactured using the stamping manufacture operations.

Other Embodiments, Considered Not Throwaways, of the Barbecuing Protective Food Supports As shown in FIGS. 3, 4, and 5, the crests 44 or apexes 44 of the parallel triangular shaped troughs 46 are curved. Therefore, both a stamping operational procedure and an alternate molding operational procedure are alternatively selected for the manufacture of this embodiment 22, often considered as a throw away food support 20. However, heavier gauge metals are also used to produce more durable barbecuing protective food supports 20 with respect to heavier embodiments, not illustrated, which appear, except for the change in thickness, as the throw away embodiment 22 appears in FIGS. 3, 4, and 6.

As illustrated in FIG. 7, thicker materials are molded or cast into embodiments 70, which in cross section, appear as continuing curved portions 72, creating the curved crests 74 and the curved troughs 76.

In reference to all embodiments, a cook has the option of spreading a cooking oil on the topside of each barbecuing protective food support 20 to create a non sticky surface. Also, as shown in FIG. 7, the food support embodiment 70 of continuing curves 72 is, optionally at time of manufacture, covered with a porcelain layer 78.

Also in reference to all embodiments of a barbecuing protective food support 20, the top sides and bottom sides, are optionally at time of manufacture, covered with a non-stick coating 80. In FIG. 8 a non-stick coated metal embodiment 82 is illustrated, the metal preferably being aluminum 83.

All Embodiments of the Barbecuing Protective Food Supports are Used for Direct Placement Over a Heating Source Throw away and not throw away embodiments of these barbecuing protective food supports 20 are used in ovens, roasters, and over camp fire, the latter use being illustrated in FIG. 9. In respect to the embodiments shown in FIGS. 5, 6, 8, and 9, removable legs 84, are illustrated in FIG. 9, which preferably are snapped into place on a slanted side 52, over the bent back portions 62, using the integral formed clip portion 86 at the top 88 of each leg 84. Such legs 84 of this design or other designs, are useful in positioning a barbecuing protective food support over wood 90 being burned as the heating source.

All Embodiments of the Barbecuing Protective Food Supports are Used Alternatively and Successively With Either Side Up As described previously, the objective in using any particular embodiment of the barbecuing protective food support 20, is to use the then cleaned and sterilized surface 92 as the top surface 94 for receiving the food 42. Then after this barbecuing time is completed, and the food support 20 has cooled sufficiently to be handled, this top surface 92 is scraped and brushed. Thereafter, this top surface 92 is orientated to become the bottom surface 94 and left so positioned for the next barbecuing time, when it is the bottom surface 94, which is exposed more directly to the heat of the heating source, and it is thereby further cleaned and sterilized. As so finally cleaned and sterilized, this then bottom surface 94 is orientated to again become the top surface 92, which is cleaned and sterilized to receive the food 42 for another barbecuing time, utilizing this barbecuing protective food support 20.

This rotation of the top becoming the bottom, then the bottom becoming the top, to obtain the clean support to receive the food is a feature of the use of all embodiments, whether or not made of aluminum, stainless steel, steel or iron, and whether or not coated or not coated, or covered with porcelain. In addition to maintaining the cleanliness of this barbecuing protective food support 20, in respect to all embodiments, the cooking food is also protected from burning, old residue odors, charcoal contaminate odors, and starter fluid odors. Moreover, the heating of the food juices and liquid fats, collecting in the troughs of this barbecuing protective food support, creates a rising and surrounding smoke which improves the taste of the food being cooked. Also the presence of the rising and surrounding smoke in the air surrounding the food being cooked tends to create a humidity, which in turn tends to moisten the food during the cooking time.

I claim:

1. A protective food support comprising a plurality of substantially parallel troughs joined at spaced crests, said plurality of troughs having a first side and a second side, the first side of said plurality of troughs being a substantially inverted image of the second side of said troughs, said spaced crests on the first side being arranged to support food over said troughs and said spaced crests on the second side arranged to support the food support on a primary grill when the first side is the upper side, said plurality of troughs being invertible so that said spaced crests on the second side of said plurality of troughs are arranged to support food over said troughs and said spaced crests on the first side are arranged to support the food support on a primary grill when the second side is the upper side, wherein said plurality of troughs on the first side have integral first end dams to prevent food juices from flowing from one trough to another trough when the first side of said troughs is the upper side, said first end dams blocking less than substantially the entire ends of said troughs, and further wherein said plurality of troughs on the second side have integral second end dams to prevent food juices from flowing from one trough to another trough when the second side is the upper side, said second end dams blocking less than substantially the entire ends of said troughs.

2. The protective food support of claim 1, wherein the food support is formed under pressure from essentially one material.

3. The protective food support of claim 2, wherein the essentially one material has substantially one thickness.

4. The protective food support of claim 2, wherein the essentially one material can withstand repeated cooking cycles.

5. The protective food support of claim 2, wherein the essentially one material is steel.

6. The protective food support of claim 2, wherein the essentially one material is aluminum.

7. The protective food support of claim 1, further comprising:

retractible legs to position the food support as a primary grill with respect to a heat source.

8. The protective food support of claim 1, wherein said spaced crests on the first side support the food support on a primary grill such that said spaced crests on the second side are located above the primary grill a distance equal to the depth of said plurality of parallel troughs.

9. The protective food support of claim 1, wherein said spaced crests and said plurality of troughs together have a common cross-sectional appearance of a repetitive cycling pattern.

10. The protective food support of claim 9, wherein said spaced crests and said plurality of troughs are curved and thereby have a common cross-sectional appearance of a repetitive curved cycling pattern.

11. The protective food support of claim 9, wherein said spaced crests and said plurality of troughs are slanted and thereby have a common cross-sectional appearance of a repetitive slanted cycling pattern.

12. The protective food support of claim 1, wherein the first side and the second side are each coated with a non-stick coating.

13. The protective food support of claim 1, wherein the first side and the second side are coated with porcelain.

* * * * *